United States Patent [19]

King

[11] Patent Number: 4,632,023

[45] Date of Patent: Dec. 30, 1986

[54] COFFEE BREWER

[76] Inventor: Alan M. King, 1750 The Boulevard, Montreal (Westmont), Canada

[21] Appl. No.: 599,712

[22] Filed: Apr. 12, 1984

[51] Int. Cl.⁴ .............................................. A47J 31/32
[52] U.S. Cl. .................................... 99/302 P; 99/287; 99/289 T
[58] Field of Search ................. 99/287, 289 R, 289 T, 99/289 D, 298 D, 302 R, 302 D; 417/269, 239; 426/433

[56] References Cited

U.S. PATENT DOCUMENTS

| | | | |
|---|---|---|---|
| 2,601,821 | 7/1952 | Johnson | 99/287 |
| 2,945,444 | 7/1960 | Leissner | 417/269 |
| 2,989,227 | 6/1961 | Statham | 417/238 |
| 3,064,553 | 11/1962 | Simjian | 99/289 |
| 3,288,049 | 11/1966 | Schmid et al. | 99/287 |
| 3,565,641 | 2/1971 | King | 99/287 |
| 4,308,789 | 1/1982 | Piloni et al. | 99/289 R |
| 4,357,861 | 11/1982 | DiGirolamo | 99/289 R |
| 4,457,216 | 7/1984 | Dremmel | 99/289 R |

Primary Examiner—Robert W. Jenkins
Attorney, Agent, or Firm—Hill, Van Santen, Steadman & Simpson

[57] ABSTRACT

The invention relates to improvements in a beverage brewing machine. In accordance with the invention, the brewing machine is able to brew a larger single cup of beverage without affecting the quality of the beverage. The brewing machine includes an upper brewing chamber, and a lower second chamber below the upper chamber and filter means between the upper and lower chambers. To increase the amount of beverage brewed, the size of the lower chamber is increased by increasing the cross-sectional area of the lower chamber. However, the area of the upper opening of the lower chamber is not increased. Specifically, a flange extends inwardly from the top of the wall of the lower chamber to thereby cover a portion of the upper end of the bore of the lower chamber.

5 Claims, 3 Drawing Figures

COFFEE BREWER

BACKGROUND OF THE INVENTION (A) Field of the Invention:

The invention relates to improvements in beverage brewing machines. More specifically, the invention relates to a beverage brewing machine which permits the brewing of a larger cup of beverage without affecting the quality of the beverage.

(B) Prior Art:

The present invention is an improvement in beverage brewing machines of the type taught in my U.S. Pat. No. 3,565,641, issued Feb. 23, 1971. The patent teaches a beverage brewing vending machine for brewing a single cup of beverage which has a brewing chamber for receiving hot water and beverage material. The chamber has a floor permeable to gas and liquid and impermeable to the beverage material. The apparatus includes a second or lower chamber of substantially the same or smaller cross-sectional size and located below the first chamber with a piston therein. Movement of the piston toward the floor of the first chamber forces air through the floor into the first chamber to agitate and brew the hot water and beverage material mixture to produce the beverage. Movement of the piston away from the floor withdraws the beverage through the floor to dispense it. The size of the cup of beverage which can be brewed with this machine is determined by the size of the second or lower chamber of the machine. Thus, in order to increase the size of the cup of beverage brewed, it would be necessary to increase the size of the second chamber. This can be done either by increasing the length or diameter of the second chamber.

Increasing the length of the chamber does not provide the optimum solution as it takes a substantial increase in length to produce an increase in volume, as the change in volume is linearly related to the change in length. As lengthening the second chamber requires also increasing the machine size, this solution is undesirable.

When the diameter of the chamber is increased, a change in volume is proportional to the square of the change in diameter. Thus a relatively smaller change in diameter can result in a larger change in volume. Accordingly, it is preferable, from a size-point-of-view, to increase the diameter rather than the length of the lower chamber.

However, increasing the diameter of the chamber also increases the diameter at the top opening thereof. As a result, the ground beverage material disposed on the filter-floor of the brewing chamber, which also covers the top opening of the lower chamber, is spread over a larger filter area so that a thinner "patty" of a given amount of material is formed. Under these conditions, a poorer quality of beverage is brewed and more filter paper is used.

SUMMARY OF INVENTION

It is therefore an object of the invention to provide a beverage brewing machine which permits the brewing of a larger cup of beverage without decreasing the quality of the brewed beverage, and without substantially increasing the size of the brewing machine.

It is a more specific object of the invention to provide such a machine having a lower chamber whose cross-sectional area is increased, but wherein the cross-sectional area of the opening of the lower chamber or filter area is not similarly increased.

In accordance with the invention, the cross-sectional area of at least one cross-section of the lower chamber is greater than the cross-sectional area of the opening at the top of the chamber or filter area.

In accordance with a particular embodiment of the invention, the beverage brewing machine includes an upper brewing chamber, and a lower second chamber disposed adjacent to and below the upper chamber. Filter means are disposed between the upper and lower chambers. The upper chamber has a filtered bottom opening having a cross-sectional area, and at least one of the cross-sectional areas of the lower chamber is greater than the area of the filtered opening.

DESCRIPTION OF THE PREFERRED EMBODIMENT

Figure 2:
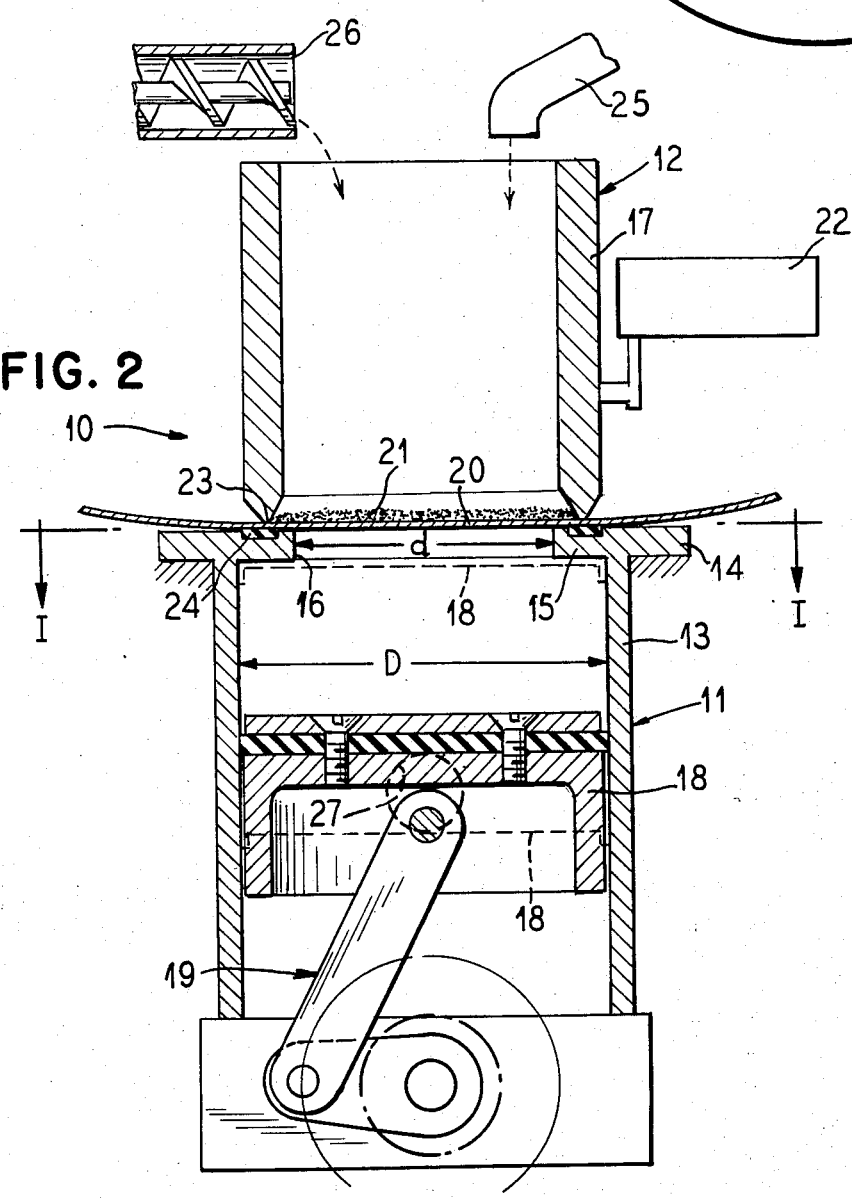
FIG. 2 is a diagrammatic longitudinal cross-sectional view through a part of the brewing machine.

The principles of the present invention are particularly useful when embodied in beverage brewing machine such as shown in FIG. 2, generally indicated by the numeral 10. The brewing machine 10 includes a lower chamber 11 underlying a brewing chamber 12. The lower chamber 11 is defined by a side wall 13, has a mounting flange 14 which extends radially outwardly from the side wall 13 at the upper end thereof, and has a flange 15 which extends radially inwardly from the side wall 13 also at the upper end to partially cover the upper end of the cylindrical bore of the lower chamber 11. Accordingly, the inside diameter D of the lower chamber 11 is greater than the diameter d at a top opening 16 thereof. Thus the area of the opening 16 is smaller than the area of a cross-section of the lower chamber 11.

The brewing chamber 12 is defined by a side wall 17 which has a bore disposed adjacent to the inner edge of the inwardly directed flange 15. In the disclosed embodiments the centers of the lower and upper chambers 11, 12 are aligned with each other.

Disposed in the lower chamber 11 are a piston 18 and a means 19 for reciprocating the piston 18, all as more fully described in the above-mentioned patent.

The brewing chamber 12 has a floor means 20 which comprises a filter means which ultimately supports a moist patty 21 of powdered beverage material, such as ground or powdered coffee beans. The brewing chamber 12 is mounted for limited vertical movement under the control of an actuating mechanism 22, and is illustrated in its lowered position. Its lower edge 23 is relatively sharp for clamping the filter means 20 against an annular sealing cushion 24 disposed on the upper surface of the annular flange 15. A pair of time-controlled dispensers respectively have a hot-water outlet 25, and a dry-beverage ingredient outlet 26 which can discharge into the upwardly open brewing chamber 12.

When a brewing-vending cycle is initiated, the brewing chamber 12 and the piston 18 are in the positions shown in solid lines. Water and dry product are then added to the brewing chamber 12. The piston having air above it is raised to the top of the lower chamber 11, thus forcing air through the filter means 20, and thereby stirring or agitating the mixture in the brewing chamber 12. The piston 18 is then retracted, creating a partial vacuum thereabove, and atmospheric pressure in the brewing chamber 12 forces the liquid through the filter means 20, thereby filtering out the solids therein which form the patty 21.

Continued retraction of the piston 18 uncovers an opening 27 leading to a discharge spout 28. The brewing chamber is raised to enable the filter means 20 to be shifted, thereby removing the patty 21 from the brewing chamber, and admitting air at atmospheric pressure above the brewed beverage to enable it to flow out. With fresh filter means 20 in place, the brewing chamber 12 is lowered to a clamping position, and the piston 18 is partially raised to close the discharge opening 27.

Thus the patty 21 is formed on the top of the filter floor means 20 in response to dispensing of the brewed beverage. The filter 20 covers the opening 16 of the lower chamber 11. By maintaining the filter area at the top of the lower chamber 11 small, a relatively thick patty of the brewing material will be formed. At the same time, by increasing the diameter and hence the area of the cross-section of the lower chamber 11, the volume of the lower chamber is increased. Accordingly, the objectives of the invention are met by the illustrated embodiment.

Although the invention has been illustrated with a cylindrical lower chamber, it is possible to have a lower chamber whose cross-sectional shape is non-circular. The shape of the opening 16 is preferably the same shape as the cross-sectional shape of the lower chamber.

Figure 1:
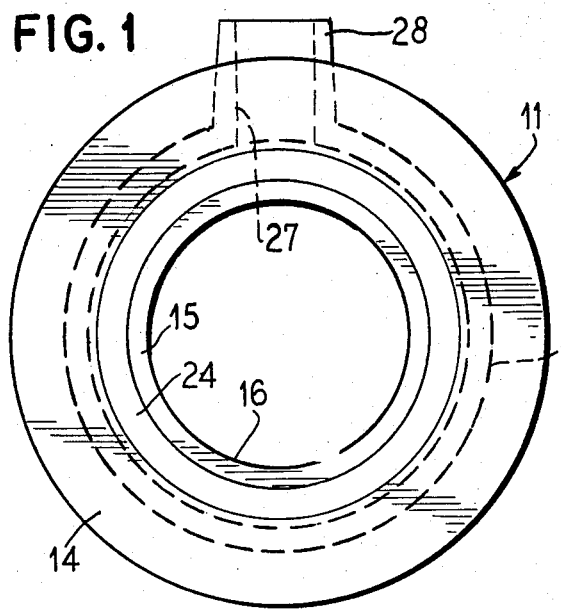
FIG. 1 is a top view of the lower chamber of the beverage brewing machine taken along line I—I of FIG. 2.
Figure 3:
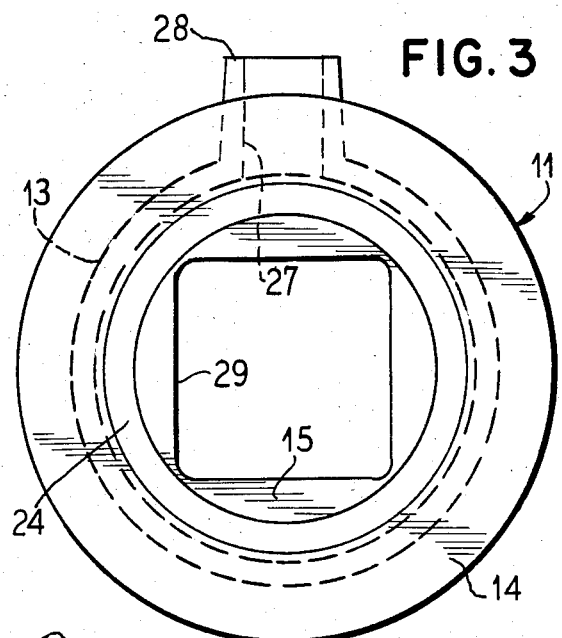
FIG. 3 is a modification of FIG. 1.

In addition, even with a cylindrical chamber, the opening can be non-circular, such as square as shown in FIG. 3 at 29.

In order to carry out the present invention with such differently shaped chambers, there would still be provided an inner flange which would partially cover the upper end of the bore of the lower chamber and define the effective filter area. Accordingly, once again, the area of the top opening would be smaller than the area of a cross-section of the lower chamber.

In a particular embodiment, the inner flange 15 extended one-half inch across the bore. The volume subtended by the opening (prior art) amounts to 205 cc whereas the volume in the present lower chamber amounts to 260 cc, namely an increase of more than 25%. This substantial increase in volume is brought about by only a small increase in the cross-sectional size of the lower chamber.

The brewing machine can be used for brewing coffee or tea or other beverages which require brewing.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A beverage brewing machine, comprising in combination:
   (a) an upper brewing chamber adapted to receive and hold hot water and a beverage material, and having an open lower end, said chamber having an internal height exceeding its transverse size;
   (b) a filter normally closing said lower end and having such porosity as to conduct fluids, but not solids of said beverage material;
   (c) a lower second chamber having an open upper end normally in registration with said open lower end, said chambers normally releaseably clamping said filter therebetween, said second chamber having a transverse size greater than said transverse size of said upper chamber; and
   (d) a reciprocable piston in said second chamber for forcing air through said filter into said brewing chamber, and for withdrawing brewed beverage through said filter, said piston having an end surface area greater than that of said open upper end of said lower second chamber overlaid by said filter, said open upper end of said lower second chamber having a transverse size less than each of said transverse sizes of said upper and lower chambers.

2. A beverage brewing machine according to claim 1, the shape of said open upper end of said second chamber being non-circular.

3. A beverage brewing machine according to claim 1, said lower second chamber having a radially inwardly extending generally annular flange defining the periphery of the opening in said upper end thereof.

4. A beverage brewing machine according to claim 1, said upper brewing chamber having a side wall, the lower end thereof being smaller than the end of said piston, and being disposed adjacent to the periphery of the opening in said open upper end of said lower second chamber.

5. A beverage brewing machine according to claim 1, said lower second chamber having a radially inwardly extending generally annular flange defining the periphery of the opening in said upper end thereof, and said upper brewing chamber having a lower end smaller than said end surface area of said piston and encircling said opening in said flange.

* * * * *